United States Patent
De Atley et al.

(10) Patent No.: US 8,484,728 B2
(45) Date of Patent: *Jul. 9, 2013

(54) MANAGING SECURELY INSTALLED APPLICATIONS

(75) Inventors: Dallas De Atley, San Francisco, CA (US); Simon Cooper, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 12/477,775

(22) Filed: Jun. 3, 2009

(65) Prior Publication Data

US 2010/0313196 A1 Dec. 9, 2010

(51) Int. Cl.
*G06F 11/00* (2006.01)

(52) U.S. Cl.
USPC ........... 726/22; 726/26; 726/30; 717/174; 711/154; 711/164

(58) Field of Classification Search
None
See application file for complete search history.

(56) References Cited

U.S. PATENT DOCUMENTS

| | | | |
|---|---|---|---|
| 6,393,420 B1 * | 5/2002 | Peters | 1/1 |
| 2005/0097342 A1 * | 5/2005 | Gatto et al. | 713/189 |
| 2005/0262503 A1 | 11/2005 | Kane | |
| 2006/0106801 A1 | 5/2006 | Cox et al. | |

FOREIGN PATENT DOCUMENTS

JP 08335812 12/1996

* cited by examiner

*Primary Examiner* — Jamie Kucab
(74) *Attorney, Agent, or Firm* — Womble Carlyle Sandridge & Rice LLP

(57) ABSTRACT

Embodiments of the present disclosure provide methods and systems for managing securely installed applications. After installation, an installation framework performs a bind process to correlate the randomly assigned identifier with the unique identifier of the application. The installation framework also manages the execution of the application. When an application is launched, the application framework performs a search for that application's randomly assigned identifier and locates the application's container. The application is then allowed to execute within its container. During execution, the software application may also be restricted in various ways by the installation framework to its dynamic containers. The installer may also work with a trusted operating system component, such as the kernel, to help enforce the container restrictions. In addition, if desired, the use of random identifiers for containers may be used in conjunction with other security mechanisms, such as the use of code signing.

20 Claims, 10 Drawing Sheets

restrictions. In addition, if desired, the use of random identifiers for containers may be used in conjunction with other security mechanisms, such as the use of code signing.

MANAGING SECURELY INSTALLED APPLICATIONS

RELATED APPLICATIONS

This application is related to U.S. patent application Ser. No. 12/477,769, entitled "Secure Software Installation," filed on Jun. 3, 2009, which is hereby incorporated by reference in its entirety.

FIELD OF THE INVENTION

The present invention relates generally to the installation of software on a computing. More particularly, this invention relates to the secure installation of software.

BACKGROUND

Software security in computing devices, especially mobile devices, today is becoming increasing important. Computing devices, especially mobile devices, have become increasingly open. For example, mobile devices now commonly allow for the installation of new applications to extend the functionality of the device. However, this openness brings security risks, such as the risk of malware, just has been seen in the world of personal computers.

To deal with these risks, most mobile device platforms have introduced various security architectures. Typically, in these security architectures, the mobile device platform is protected based on granting privileges to software, usually based on code signing. The access control decision to assign privileges to software processes is based either on code signing or on explicit user approval, or a combination thereof.

Unfortunately, the cost of obtaining signatures and meeting strict quality requirements deters many developers from participating and contributing to application development. If a certain piece of software does not come with an acceptable signature, the mobile device may give the user the option of deciding whether that software should be granted the requested privileges. Designing the user interaction for this step without hampering usability and security can be tedious. Furthermore, when users are simply prompted whether they want to grant certain privileges to some software, they often do not have enough information to understand the implications of this action.

SUMMARY OF THE DESCRIPTION

Embodiments of the present disclosure provide methods and systems for managing securely installed applications. In one embodiment, applications are securely installed on a computing device in various containers configured in the storage of the computing device. The containers are located in directories having randomly assigned identifiers that are unknown to the application at runtime. After installation, an installation framework performs a bind process to correlate the randomly assigned identifier with the unique identifier of the application. The installation framework also manages the execution of the application. When an application is launched, the application framework performs a search for that application's randomly assigned identifier and locates the application's container. The application is then allowed to execute within its container. During execution, the software application may also be restricted in various ways by the installation framework to its dynamic containers. The installer may also work with a trusted operating system component, such as the kernel, to help enforce the container restrictions. In addition, if desired, the use of random identifiers for containers may be used in conjunction with other security mechanisms, such as the use of code signing.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
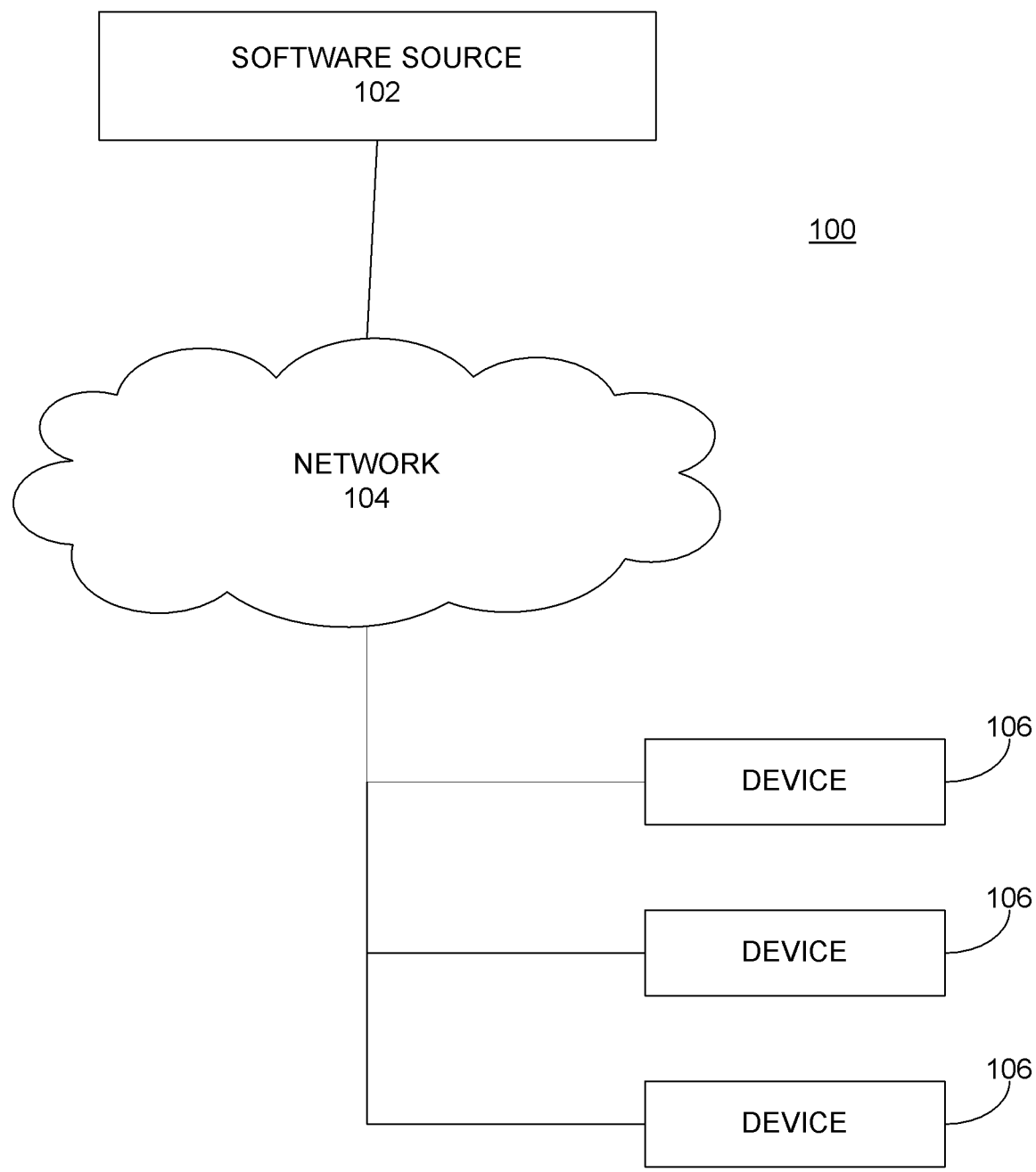
FIG. 1 is an example of an environment suitable for practicing various embodiments described herein.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Embodiments of the present disclosure provide methods and systems for securely installing software on a computing device, such as a mobile device. In one embodiment, the device executes an installer that securely installs the software. In order to perform installations securely, the installer configures one or more secure containers for the software and installs the software exclusively in these containers. In some embodiments, the installer randomly determines the identifiers for the containers. These identifiers remain unknown to the software to be installed. Instead, an installation framework maintains the correspondence between an application and its container.

For example, each software application may have a unique identifier. This unique identifier may be included in the installation request or also determined by the installer. The installer then determines a randomly assigned identifier, such as a directory name, for one or more containers on the device in which the application will be installed. The containers may be a specific area of storage on the device or a directory defined on the device. Data specific to the software application including code storage, documents, preferences, and other libraries are stored and restricted to these dynamic containers.

After installation, an installation framework performs a bind process to correlate the randomly assigned identifier with the unique identifier of the application. The installation framework also manages the execution of the application. For example, when the application is launched, the application framework performs a search for that application's randomly assigned identifier and locates the application's container. The application is then allowed to execute within its container. During execution, the software application may also be restricted in various ways by the installation framework to its dynamic containers. The installer may also work with a trusted operating system component, such as the kernel, to help enforce the container restrictions.

As noted, the installer may use randomly assigned identifiers for the containers, which are unknown to the software being installed. The random identifiers may be based on various functions, such as a hash function and the like. In addition, the random identifiers for the containers may be based on various unique attributes of the software. In some embodiments, the installer stores this information only in a trusted cache for access by the installation framework.

Moreover, if desired, the use of random identifiers for containers may be used in conjunction with other security mechanisms. For example, the operating system of the computing device may be configured to determine whether the code has been authorized by a trusted authority.

For example, a trusted authority may authorize software for installation and/or execution by digitally signing the software. As is known in the art, a digital signature uses public key cryptography to ensure the integrity of data. If the code is authorized and verified as such, it may be generally executed without any further system or user interaction; if the code is not authorized, its ability to be executed on the computing device may be restricted or even prevented.

In some embodiments, the computing device may alert the user that the code is not authorized and ask the user if they still wish to execute the unauthorized code. In other embodiments, the computing devices may be configured to prevent unauthorized code from being executed at all, regardless of the user's wishes.

Figure 2A:
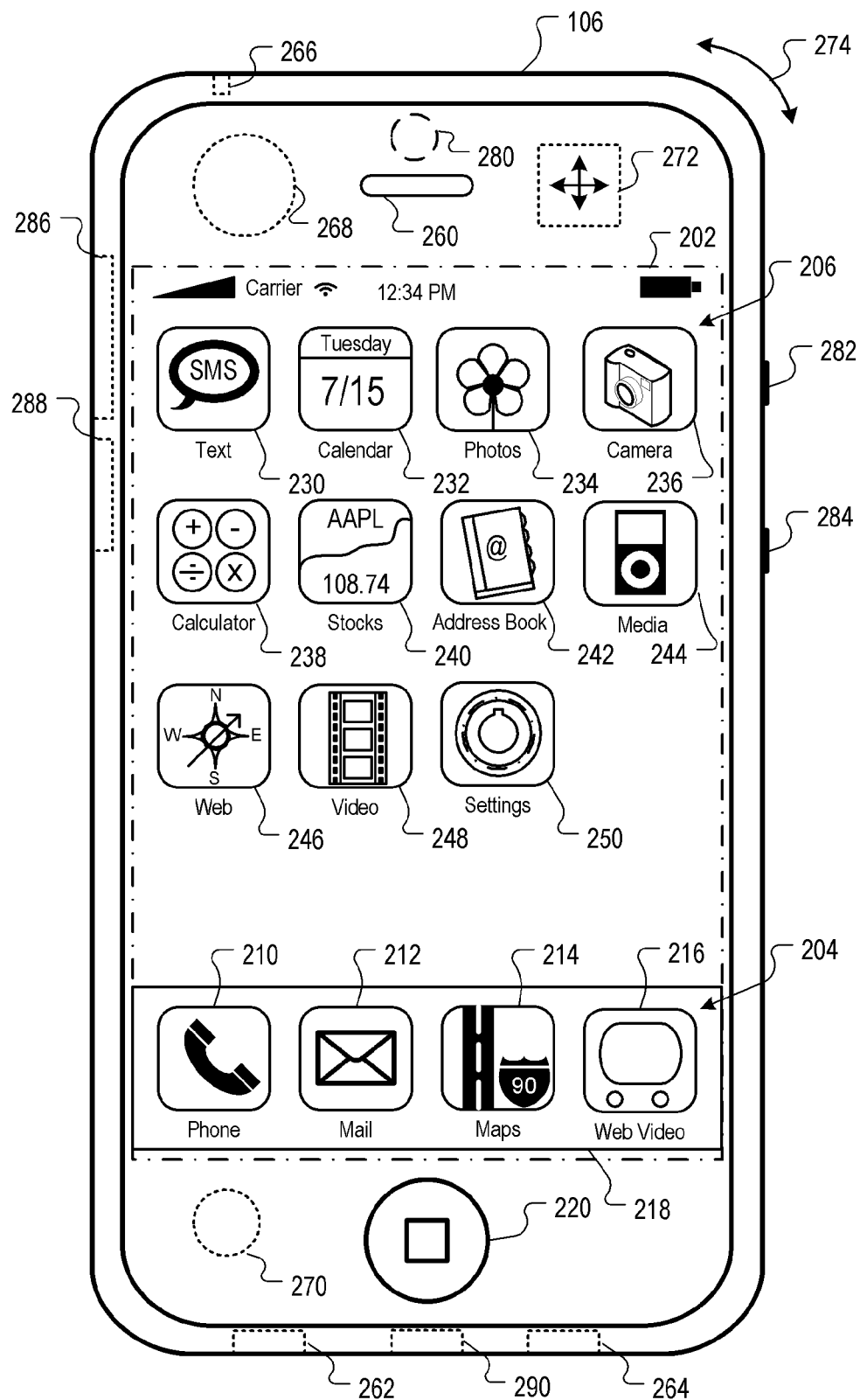
FIGS. 2A and 2B illustrate an exemplary mobile device which may be used with an embodiment of the invention.
Figure 2B:
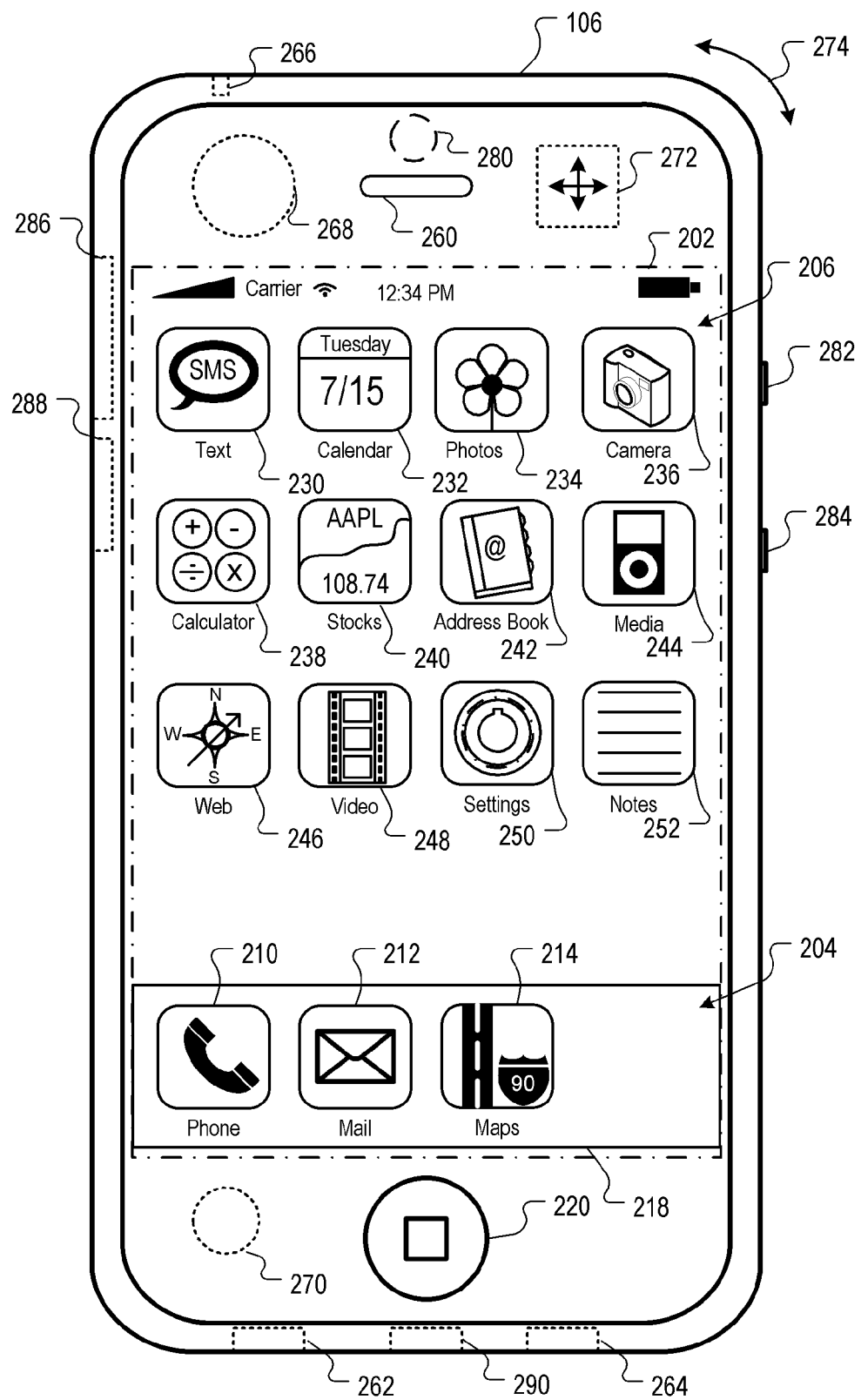
Figure 3:
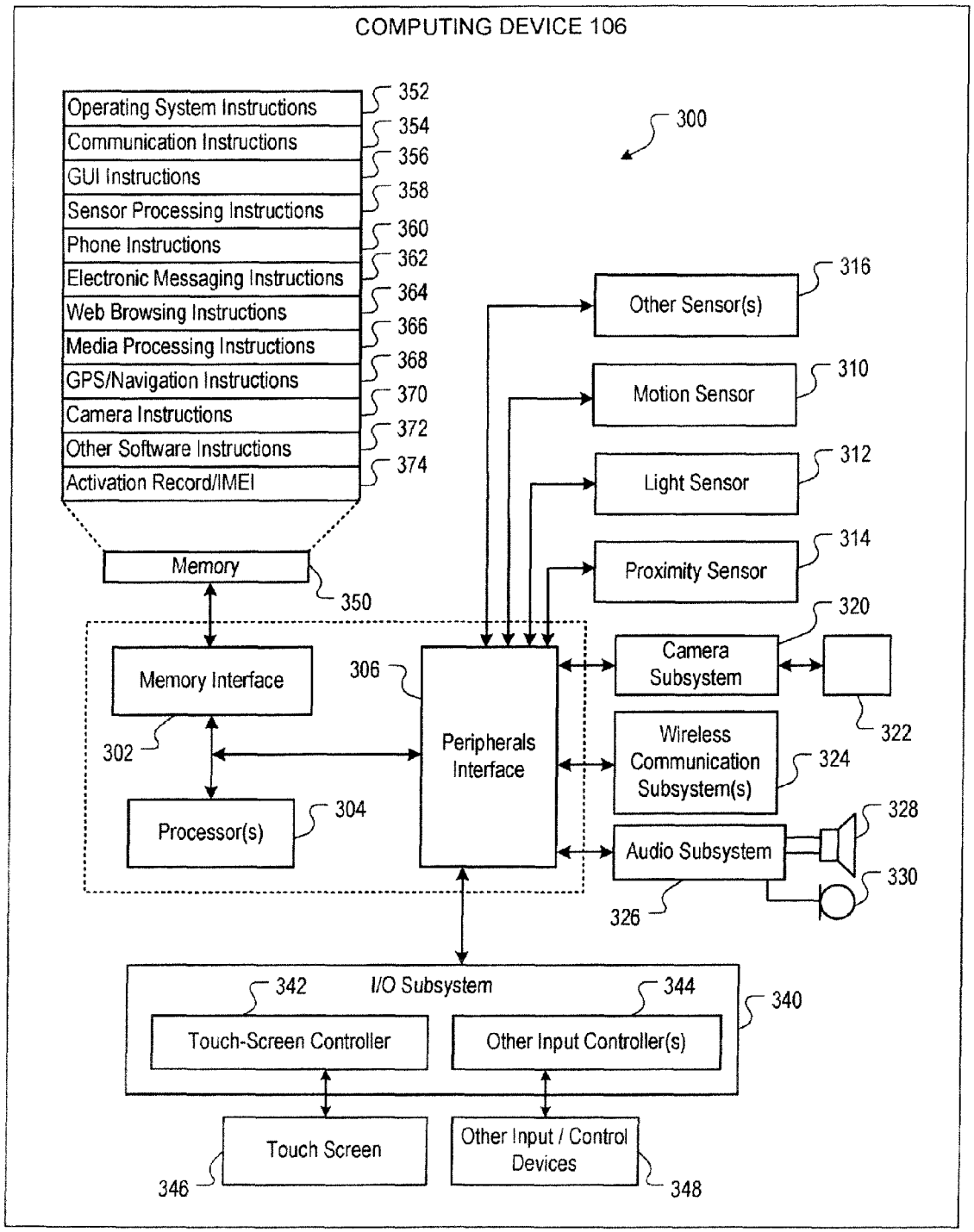
FIG. 3 is a block diagram of an example implementation of a mobile device which may be used with an embodiment of the invention.
Figure 4:
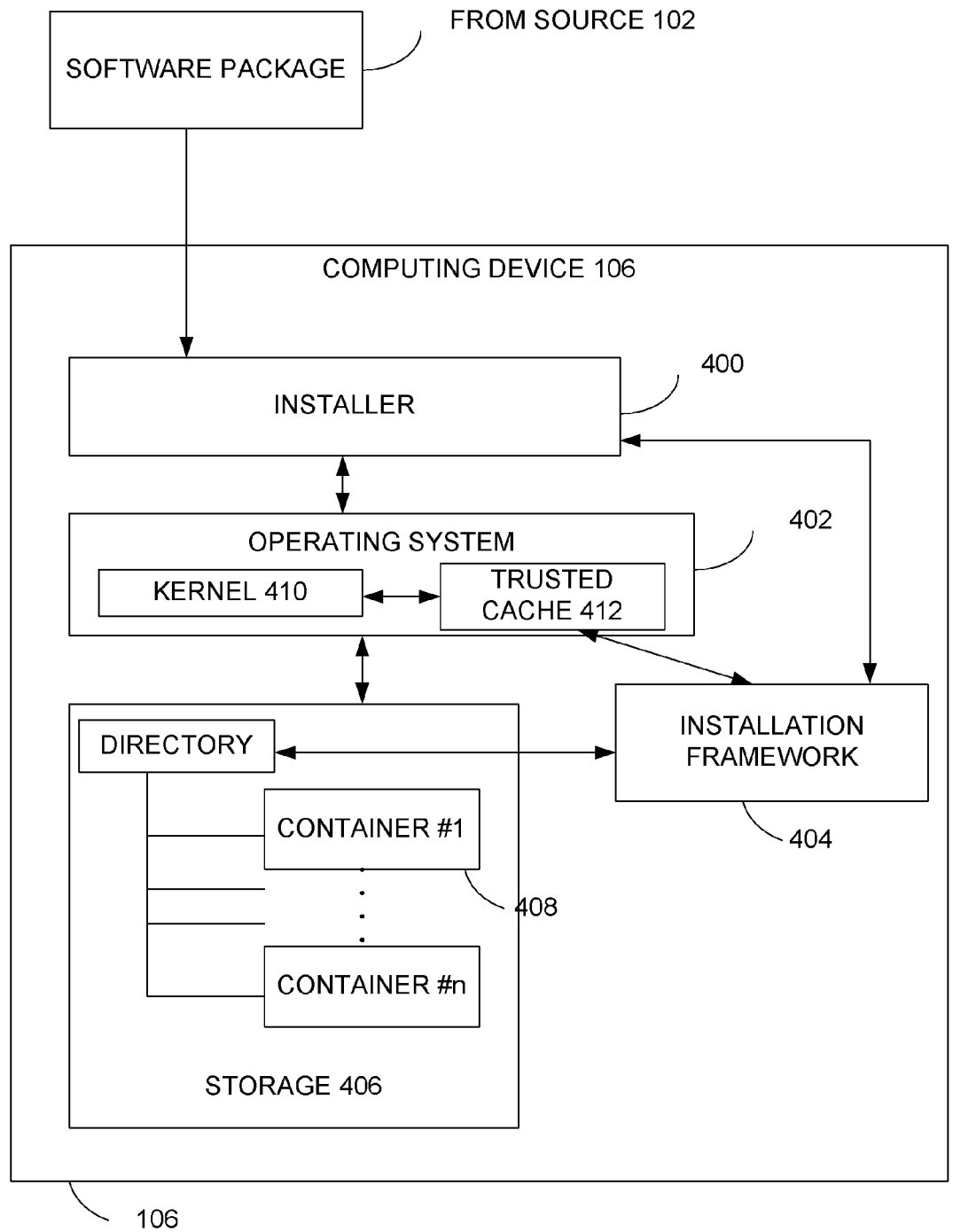
FIG. 4 illustrates a conceptual block diagram of an environment on the computing device that supports secure installation of software according to one embodiment.
Figure 5:
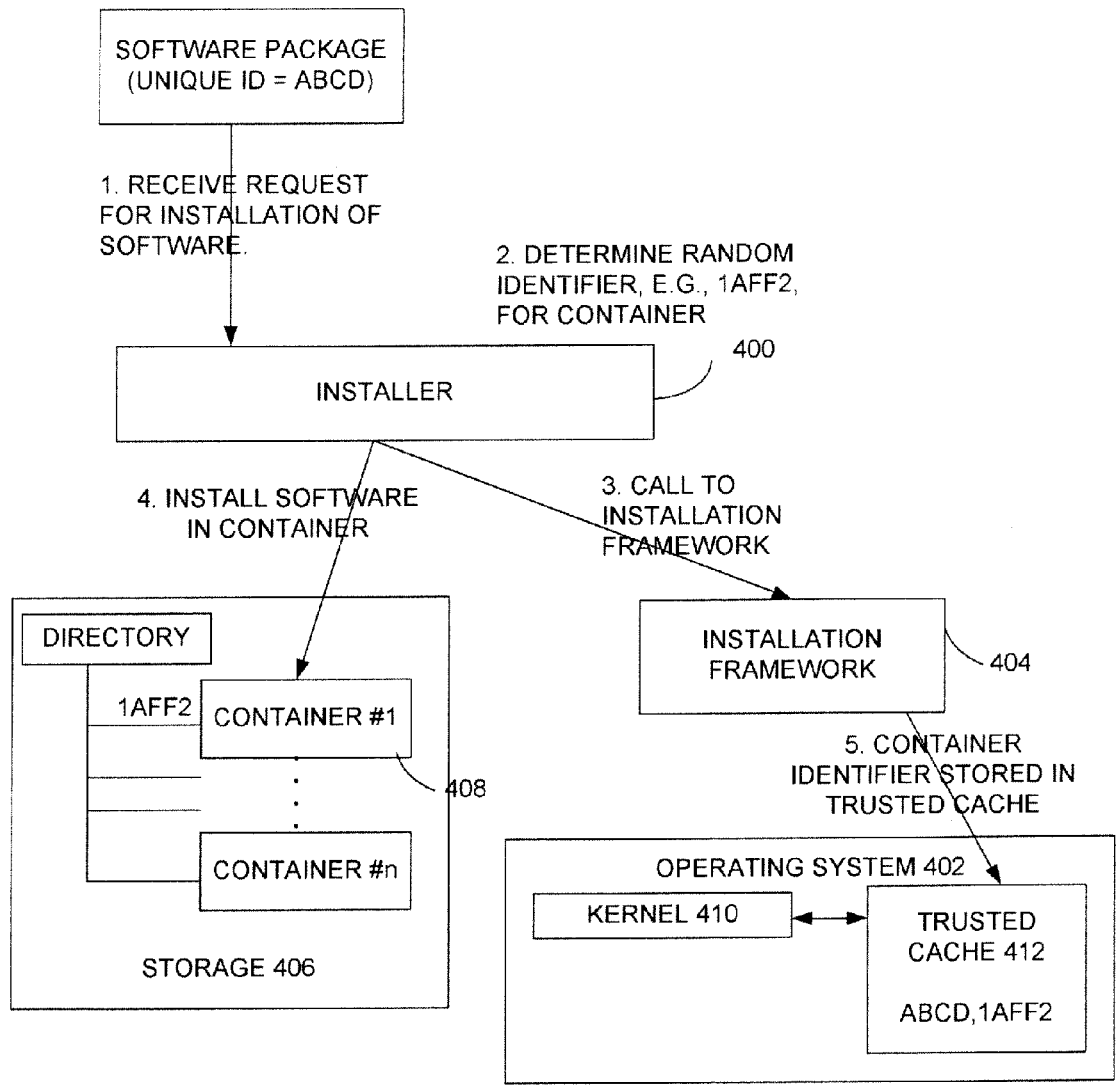
FIG. 5 illustrates an exemplary process for securely installing software on the computing device according to one embodiment.
Figure 6:
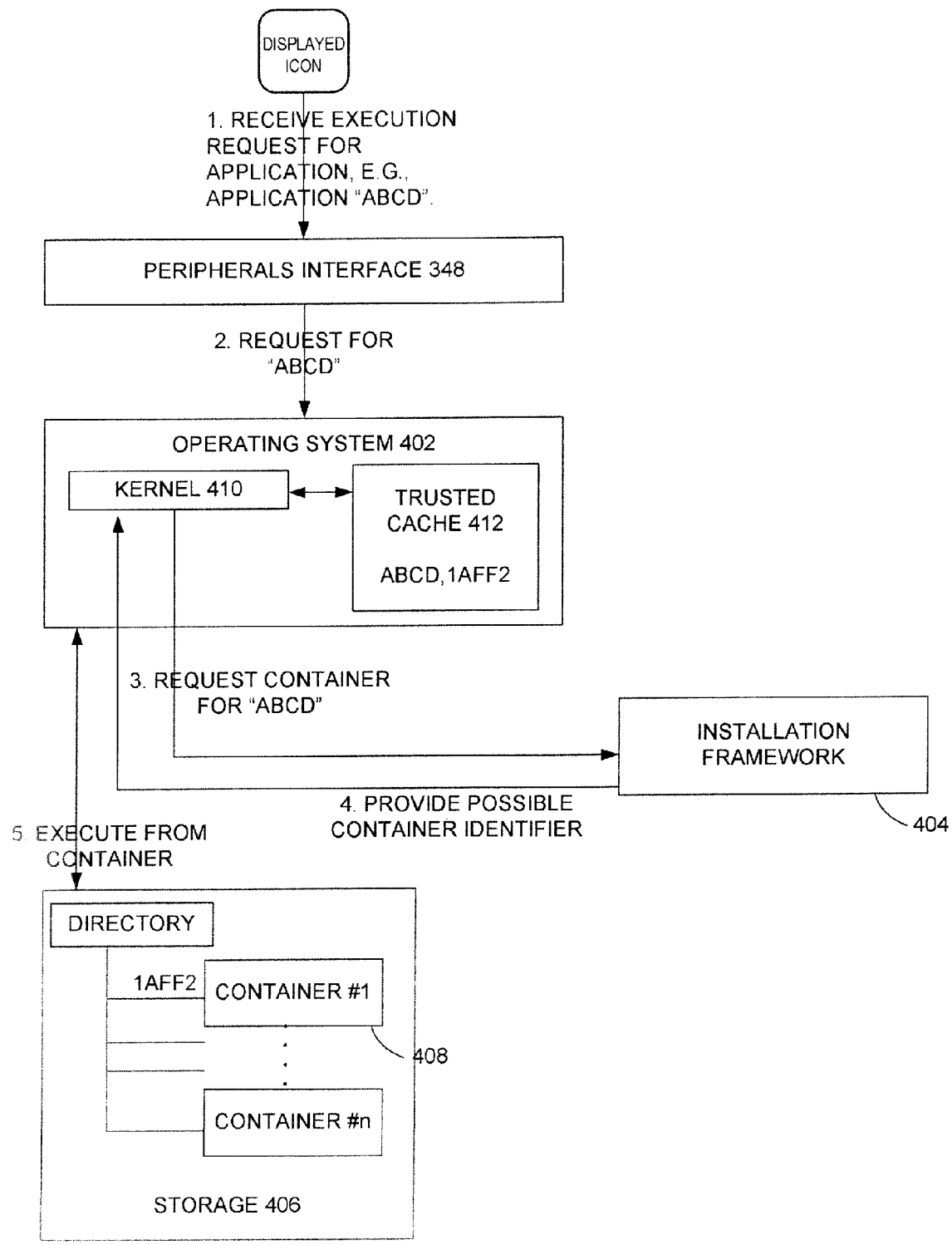
FIG. 6 illustrates an exemplary process for managing and synchronizing securely installed software on the computing device according to one embodiment.

In order to help explain the embodiments of these and other concepts, FIGS. 1-7 are provided in this description. FIG. 1 shows an example of a computing environment in which the embodiments may be implemented. FIGS. 2A-2B and FIG. 3 illustrate an exemplary mobile device. FIG. 4 illustrates a conceptual block diagram of an environment on the computing device 106 that supports secure installation of software. And, FIGS. 5 and 6 illustrate exemplary processes for securely installing software and for managing and synchronizing software. These figures will now be further described below beginning with reference to FIG. 1.

FIG. 1 is an example of an environment suitable for practicing various embodiments described herein. As shown, system 100 may comprise a source 102 for the software and/or program code to be installed, a network 104, and a set of computing devices 106. These entities and components will now be further described.

Source 102 serves as the source of the software or program code to be installed. For example, source 102 can be a website, or service that is accessible to the computing devices 106. In some embodiments, source 102 is an application that runs on the computing device 106 and makes source 102 accessible via the network 102.

For example, the source 102 may be a website or service, which allows users of the computing devices 106 to browse and download applications from an online content and media store. Such media stores may include stores, such as Apple's iTunes Store, App Catalog by Palm Inc., Android Market, Windows Marketplace for Mobile by Microsoft, the Ovi store by Nokia, and BlackBerry App World by Research in Motion.

The applications on source 102 may be available to purchase or free of charge, depending on the application. The applications can be downloaded directly to the computing devices 106 as will be further described.

Alternatively, source 102 may be associated with a particular software provisioning facility or developer that has been authorized to provide or deliver an application to be installed or tested in the device. Furthermore, source 102 may be associated with an Enterprise entity that has a massive installation scheme. That is, an application may be distributed and installed in devices that are associated with the Enterprise entity (e.g., employees of an Enterprise entity).

Network 106 provides a communication infrastructure between computing devices 106 and source 106. Network 106 may be any type of wide-area, metropolitan-area, or local area network. In addition, network 106 may comprise both wired and wireless components.

In some embodiments, network 106 may be implemented on the Internet, which is the well-known global network of interconnected computers, enabling users to share information. The components and protocols employed by network 106 are well known to those skilled in the art.

Computing devices 106 may an computing device used by a user. Computing devices 106 may be mobile computing devices, such as mobile telephones, mobile smart-phones, or some other type of mobile device. Computing devices 106 may be configured to run an operating system that requires some or all of its software and code to have been securely installed. Thus, if software is delivered or installed in an unauthorized state to computing devices 106, the devices may be unable to fully execute the code instructions included in the software because they have not been properly installed.

Computing devices 106 may be any number of different types of computing devices, including desktop computers, laptop computers, handheld computers, personal digital assistant (PDA) devices, mobile telephone devices, media play device, and the like. For purposes of illustration, various embodiments related to a mobile device are provided. However, one skilled in the art will recognize that the embodiments can be applied to any type of computing device.

FIG. 2A illustrates an example mobile device 106. The mobile device 106 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 106 includes a touch-sensitive display 202. The touch-sensitive display 202 can be implemented with liquid crystal display (LCD) technology, light emitting polymer display (LPD) technology, or some other display technology. The touch sensitive display 202 can be sensitive to haptic and/or tactile contact with a user.

In some implementations, the touch-sensitive display 202 can comprise a multi-touch-sensitive display 202. A multi-touch-sensitive display 202 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 106 can display one or more graphical user interfaces on the touch-sensitive display 202 for providing the user access to various system objects and for conveying information to the user. In some implementations, the graphical user interface can include one or more display objects 204, 206. In the example shown, the display objects 204, 206, are graphic representations of system objects. Some examples of system objects include device functions, applications, windows, files, alerts, events, or other identifiable system objects.

Example Mobile Device Functionality

In some implementations, the mobile device 106 can implement multiple device functionalities, such as a telephony device, as indicated by a Phone object 210; an e-mail device, as indicated by the Mail object 212; a map devices, as indicated by the Maps object 211; a Wi-Fi base station device (not shown); and a network video transmission and display device, as indicated by the Web Video object 216. In some implementations, particular display objects 204, e.g., the Phone object 210, the Mail object 212, the Maps object 214, and the Web Video object 216, can be displayed in a menu bar 218. In some implementations, device functionalities can be accessed from a top-level graphical user interface, such as the graphical user interface illustrated in FIG. 2A. Touching one of the objects 210, 212, 214, or 216 can, for example, invoke a corresponding functionality.

In some implementations, the mobile device 106 can implement a network distribution functionality. For example, the functionality can enable the user to take the mobile device 106 and provide access to its associated network while traveling. In particular, the mobile device 106 can extend Internet access (e.g., Wi-Fi) to other wireless devices in the vicinity. For example, mobile device 106 can be configured as a base station for one or more devices. As such, mobile device 106 can grant or deny network access to other wireless devices.

In some implementations, upon invocation of a device functionality, the graphical user interface of the mobile device 106 changes, or is augmented or replaced with another user interface or user interface elements, to facilitate user access to particular functions associated with the corresponding device functionality. For example, in response to a user touching the Phone object 210, the graphical user interface of the touch-sensitive display 202 may present display objects related to various phone functions; likewise, touching of the Mail object 212 may cause the graphical user interface to present display objects related to various e-mail functions; touching the Maps object 214 may cause the graphical user interface to present display objects related to various maps functions; and touching the Web Video object 216 may cause the graphical user interface to present display objects related to various web video functions.

In some implementations, the top-level graphical user interface environment or state of FIG. 2A can be restored by pressing a button 220 located near the bottom of the mobile device 106. In some implementations, each corresponding device functionality may have corresponding "home" display objects displayed on the touch-sensitive display 202, and the graphical user interface environment of FIG. 2A can be restored by pressing the "home" display object.

In some implementations, the top-level graphical user interface can include additional display objects 206, such as a short messaging service (SMS) object 230, a Calendar object 232, a Photos object 234, a Camera object 236, a Calculator object 238, a Stocks object 240, a Address Book object 242, a Media object 244, a Web object 246, a Video object 248, a Settings object 250, and a Notes object (not shown). Touching the SMS display object 230 can, for example, invoke an SMS messaging environment and supporting functionality; likewise, each selection of a display object 232, 234, 236, 238, 240, 242, 244, 246, 248, and 250 can invoke a corresponding object environment and functionality.

Additional and/or different display objects can also be displayed in the graphical user interface of FIG. 2A. For example, if the device 106 is functioning as a base station for other devices, one or more "connection" objects may appear in the graphical user interface to indicate the connection. In some implementations, the display objects 206 can be configured by a user, e.g., a user may specify which display objects 206 are displayed, and/or may download additional applications or other software that provides other functionalities and corresponding display objects.

In some implementations, the mobile device 106 can include one or more input/output (I/O) devices and/or sensor devices. For example, a speaker 260 and a microphone 262 can be included to facilitate voice-enabled functionalities, such as phone and voice mail functions. In some implementations, an up/down button 284 for volume control of the speaker 260 and the microphone 262 can be included. The mobile device 106 can also include an on/off button 282 for a ring indicator of incoming phone calls. In some implementations, a loud speaker 264 can be included to facilitate hands-free voice functionalities, such as speaker phone functions. An audio jack 266 can also be included for use of headphones and/or a microphone.

In some implementations, a proximity sensor 268 can be included to facilitate the detection of the user positioning the mobile device 106 proximate to the user's ear and, in response, to disengage the touch-sensitive display 202 to prevent accidental function invocations. In some implementations, the touch-sensitive display 202 can be turned off to conserve additional power when the mobile device 106 is proximate to the user's ear.

Other sensors can also be used. For example, in some implementations, an ambient light sensor 270 can be utilized to facilitate adjusting the brightness of the touch-sensitive display 202. In some implementations, an accelerometer 272 can be utilized to detect movement of the mobile device 106, as indicated by the directional arrow 274. Accordingly, display objects and/or media can be presented according to a detected orientation, e.g., portrait or landscape. In some implementations, the mobile device 106 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 106 or provided as a separate device that can be coupled to the mobile device 106 through an interface (e.g., port device 290) to provide access to location-based services.

In some implementations, a port device 290, e.g., a Universal Serial Bus (USB) port, or a docking port, or some other wired port connection, can be included. The port device 290 can, for example, be utilized to establish a wired connection to other computing devices, such as other communication devices 106, network access devices, a personal computer, a printer, a display screen, or other processing devices capable of receiving and/or transmitting data. In some implementations, the port device 290 allows the mobile device 106 to synchronize with a host device using one or more protocols, such as, for example, the TCP/IP, HTTP, UDP and any other known protocol.

The mobile device 106 can also include a camera lens and sensor 280. In some implementations, the camera lens and sensor 280 can be located on the back surface of the mobile device 106. The camera can capture still images and/or video.

The mobile device 106 can also include one or more wireless communication subsystems, such as an 802.11b/g communication device 286, and/or a Bluetooth™ communication device 288. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), LTE (long term evolution) Advanced, etc.

Example Configurable Top-Level Graphical User Interface

FIG. 2B illustrates another example of configurable top-level graphical user interface of device 106. The device 106 can be configured to display a different set of display objects.

In some implementations, each of one or more system objects of device 106 has a set of system object attributes associated with it; and one of the attributes determines whether a display object for the system object will be rendered in the top-level graphical user interface. This attribute can be set by the system automatically, or by a user through certain programs or system functionalities as described below. FIG. 2B shows an example of how the Notes object 252 (not shown in FIG. 2A) is added to and the Web Video object 216 is removed from the top graphical user interface of device 106 (e.g. such as when the attributes of the Notes system object and the Web Video system object are modified).

Example Mobile Device Architecture

FIG. 3 is a block diagram 300 of an example implementation of a mobile device 106. As shown, the mobile device can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 311 can be coupled to the peripherals interface 306 to facilitate the orientation, lighting, and proximity functions described with respect to FIG. 2A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device is intended to operate. For example, a mobile device can include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the mobile device may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device on or off. The user may be able to customize a functionality of one or more of the buttons. The touch screen 346 can, for example, also be used to implement virtual or soft buttons and/or a keyboard.

In some implementations, the mobile device can present recorded audio and/or video files, such as MP3, AAC, and MPEG files. In some implementations, the mobile device can include the functionality of an MP3 player, such as an iPod™. The mobile device may, therefore, include a 32-pin connector that is compatible with the iPod™. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., access control management functions. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device may be implemented in hardware and/or in software, including in one or more signal processing and/or application specific integrated circuits.

FIG. 4 illustrates a conceptual block diagram of an environment on the computing device 106 that supports secure installation of software. As shown, in order to implement secure installation of software, the computing device 106 may comprise an installer 400, an operating system 402, an installation framework 404, storage 406, one or more containers 408 arranged in a directory structure. These components will now be further described.

Installer 400 is a program or process that installs files, such as applications, drivers, or other software, on computing device 106. In some embodiments, installer 400 is configured to read and analyze the contents of a software package to be installed, such as a software package from source 102.

A software package from source 102 may have a specific format and information that is used by installer 400. In particular, a software package may include the software's full name, a unique identifier for the software, a description of its purpose, version number, vendor, checksum, and a list of dependencies necessary for the software to run properly. Upon installation, installer 400 may also store metadata about the software.

In addition, the installer 400 may be interfaced based on a predetermined application programming interface (API). In one embodiment, the API comprises functions to install an application, uninstall an application, archive an application, and list installed applications. The API can also provide functions that instruct installer 400 to verify application installation and access restrictions at run time. In some embodiments, the API for the installer 400 may provide primitives for these functions via a trusted portion of the operating system 402, such as the kernel 410.

Operating system 402 generally serves as an interface between hardware and the user. In particular, operating system 402 may be responsible for the management and coordination of activities and the sharing of the resources of the computing device 106. Operating system 402 primarily acts as a host for applications, and thus, includes instructions that handle the details of the operation of the hardware of the computing device 106.

In addition, operating system 402 may offer a number of services to application programs and users. The applications running on computing device 106 may access these services through APIs or system calls. For example, by calling an API function, an application can request a service from the operating system 402, pass parameters, and receive the results of the operation.

In some embodiments, operating system 402 may be like operating system 352, shown in FIG. 3. Accordingly, operating system 402 may be an operating system, such as Darwin, RTXC, LINUX, UNIX, OS X, WINDOWS, or an embedded operating system such as VxWorks.

Kernel 410 is the central trusted component of operating system 402. The functions of kernel 410 responsibilities include managing the resources, such as the resources shown in FIGS. 2A-2B and FIG. 3. In particular, kernel 410 provides access to resources, such as the memory 350, processor(s) 304, and I/O subsystems 340 of computing device 106. In general, kernel 410 may employ API system calls and inter-process communications to perform its function.

Trusted cache 412 is a temporary storage area where frequently accessed data, such as randomly assigned identifiers for containers 408, can be stored for rapid access. For example, cache 412 may be implemented in memory 350 of computing device 106. Furthermore, trusted cache 412 may be maintained in a trusted space of memory 350 in order secure its information. In some embodiments, access to trusted cache 412 may be limited to certain components, such as kernel 410.

Installation framework 404 is a library file that controls how applications are securely installed on the computing device 106 and the management of the securely installed applications. In some embodiments, the installation framework 404 restricts where and how applications can be installed on the computing device 106. For example, the installation framework 404 may contain supporting programs, libraries, or references to other files.

Storage 406 may be any data storage device, such as a hard disk, memory, optical disk, etc. for computing device 106. In some embodiments, information is stored in storage 406 based on a known file system and directory structure. Such file systems and directory structures are known to those skilled in the art.

Of note, however, the various embodiments may employ directories having randomly assigned identifiers or names. In particular, these random identifiers provide a level of indirection that helps allow the installation framework 404 control the installation and execution of software within its container. The random identifiers are unknown to the application itself and known only to the installation framework 404. This mechanism provides the operation system 402 a point of control that ensures the behavior of an application's installation and execution.

Containers 408 refer to any collection of resources that are used store the program code of a software application and used by the application running on computing device 106, such as disk space on storage 406 and/or space memory in memory 350. In some embodiments, containers 408 may comprise a directory that refers to a specific area of storage

406 on the device 106. Data specific to the software application including code storage, documents, preferences, and other libraries are stored and restricted to the containers 408.

In order to enhance security, containers 408 can employ randomly assigned identifiers, such as random directory names, that are unknown to the application. One advantage, among others, is that this prevents the application from becoming a security risk since it does not directly control its resources or directory space. As noted, the installer 400 may use randomly assigned identifiers for the containers 408. The random identifiers may be based on various functions, such as a hash function of information provided in the application's package, some other type of cryptographic function, and the like. In addition, the random identifiers for the containers 408 may be based on various unique attributes of the software. For example, unique application identifiers in the form of com-.domain.email may be used in determining the random identifier for the container 408. In some embodiments, the installer 400 stores this information only in trusted cache 412.

During execution, a software application may also be restricted in various ways to its containers 408. For example, containers 408 may comprise a set of resource limits imposed on programs by kernel 410, such as I/O bandwidth caps, disk quotas, network access restrictions, and as noted above a restricted directory namespace known only to the installation framework 404.

FIG. 5 illustrates an exemplary process for securely installing software on the computing device 106. As shown, first, computing device 106 may receive a request to install an application. For example, a user of computing device 106 may access source 102 and select one or more applications for download and installation. Accordingly, source 102 may then provide a package for the selected software to be installed on the computing device 106. As noted, the package may include the software's full name, a unique identifier for the software, a description of its purpose, version number, vendor, checksum, and a list of dependencies necessary for the software to run properly. For example, in the example shown in FIG. 5, the requested application has a unique identifier of "ABCD." Upon receiving this package, operating system 402 may execute installer 402 as a running process to perform the installation of the requested software.

Second, installer 400 determines a container 408 for the application. For example, installer 400 may randomly assign an identifier or name for a directory that is to be used as container 408 for the application, e.g., application ABCD. For example, installer 400 may perform various cryptographic functions to determine/generate a random identifier for container 408. Such cryptographic functions are known to those skilled in the art. In some embodiments, installer 400 may employ a hashing function that is based on information from the package in order to determine/generate the random identifier for container 408. In addition, installer 400 may utilize various arbitrary attributes of the software to determine the random identifier. In the example shown in FIG. 5, installer 400 has generated "1AFF2" as the random identifier for the container 408.

Third, installer 400 makes a call to installation framework 404. In response, installation framework 404 may record the random identifier and associate it with the application. In addition, installation framework 404 may determine various constraints, such as I/O limits, storage space, etc., for the requested application in container 408.

Fourth, installer 400 installs the program code, etc. in its container 408. In some embodiments, each application is given one container 408. For example, installer 400 may call installation framework 404 and install compiled code in storage 406.

Fifth, the identifier for container 408 is stored in trusted cache 412 for later use by operating system 402 and kernel 410. For example, installation framework 404 may record an entry in trusted cache 412 that correlates application "ABCD" with container identifier "1AFF2" for container 408. Of course, the installation framework 404 may utilize other bind processes to correlate the randomly assigned identifier with the application being installed.

In addition to the process described above, when a request to install the software is received, computing device 106 can also check a digital signature of the software or software package to verify its authenticity and/or authorization. If the software is verified as being signed by a trusted authority, installation framework 404 may also permit installation of the computing device 106 as additional or alternative criteria for allowing installation.

FIG. 6 illustrates an exemplary process for managing and synchronizing securely installed software on the computing device 106. In general, the installation framework 404 manages the launching and execution of applications being executed on the computing device 106. In particular, the installation framework 404 provides a mechanism by which the operating system 402 identifies and locates the container 408 for an application.

First, computing device 106 receives a request to launch or execute an application that has been securely installed on computing device 106. For example, a user of computing device 106 may select an application installed on the computing device. In the example shown in FIG. 6, application "ABCD" has been selected by the user using a peripheral, such as a touch screen, etc. This information may then be passed via peripheral interface 348 to operating system 402.

Second, operating system 402 services this request. For example, operating system 402 may instruct kernel 410 to execute the requested application, e.g., application "ABCD." Because this application has been securely installed, the location of container 408 is unknown or initially beyond the control of the application.

Accordingly, third, kernel 410 makes a call to installation framework 404 requesting the identifier for container 408 for application "ABCD." Fourth, installation framework 404 may then perform a search for the container 408 for the requested application and then responds with the identifier for container 408, e.g., "1AFF2."

For example, kernel 410 may perform a comparison of this unique identifier with the information stored in trusted cache 412. For example, kernel 410 may perform a text comparison to determine whether the identifier matches an entry that is stored in trusted cache 412.

If the information does not match what is stored in trusted cache 412, then operating system 402 may deny the application and/or prompt the user for a response. For example, the operating system 402 may provide a warning message that the application could not be found by installation framework 404.

If the information matches what is stored in trusted cache 412, then, fifth, kernel 410 continues its service of the application. In particular, the application is allowed to execute on computing device 106 within the constraints of its container 408.

In addition to the process described above, when a request to execute the software is received, computing device 106 can also check a digital signature of the software to verify its authenticity and/or authorization. If the software is verified as being signed by a trusted authority, installation framework 404 may use this verification as additional or alternative criteria for allowing execution.

Figure 7:
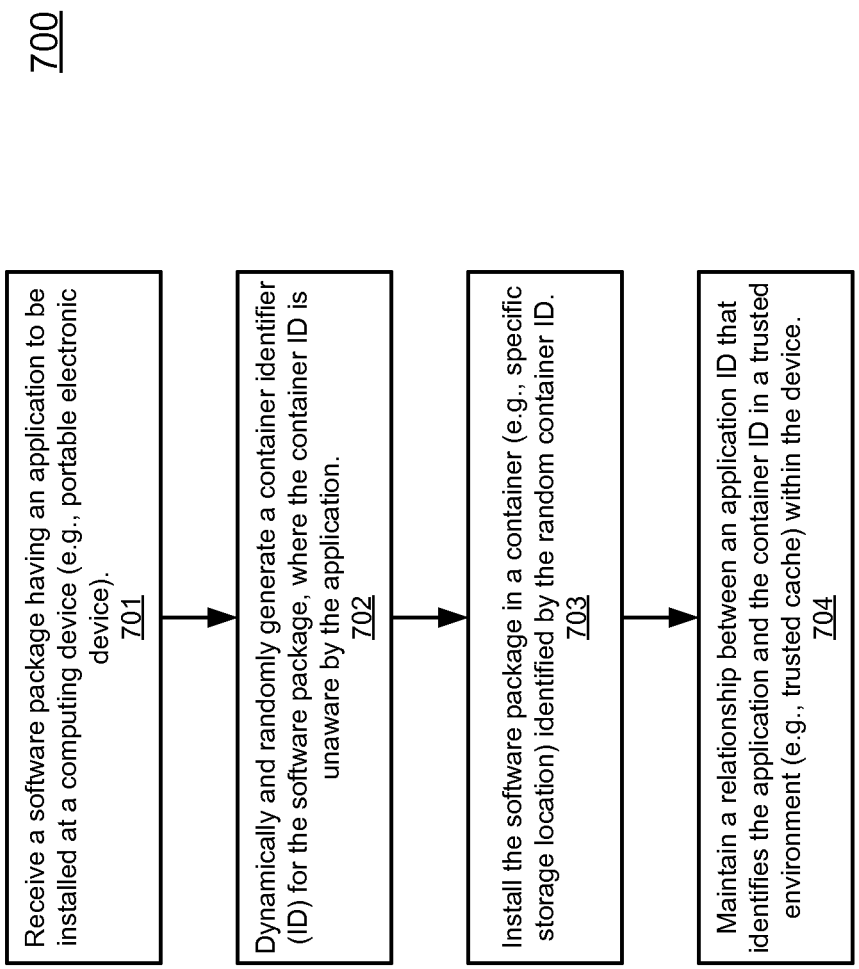
FIG. 7 is a flow diagram illustrating a method for securely installing an application according to one embodiment of the invention.

FIG. 7 is a flow diagram illustrating a method for securely installing an application according to one embodiment of the invention. Note that method 700 may be performed by processing logic which may include software, hardware, or a combination thereof. For example, method 700 may be performed by a system as shown in FIG. 5. Referring to FIG. 7, at block 701, a software package is received to be installed within a computing device, such as a portable electronic device (e.g., iPhone from Apple Inc.) For example, the software package may be purchased or downloaded from a Web site such as iTune. Alternatively, the software package may be associated with a particular software provisioning facility or developer that has been authorized to provide or deliver an application to be installed or tested in the device. Furthermore, the software package may be associated with an Enterprise entity that has a massive installation scheme. That is, an application may be distributed and installed in devices that are associated with the Enterprise entity (e.g., employees of an Enterprise entity). The software package may include one or more applications, each identified by an application ID, to be installed, as well as other associated data or metadata files.

In response, at block 702, a container ID is dynamically and randomly generated, where the container ID has no pre-existing correlation with the software package and/or an application therein. The container ID is used to identify a specific storage location in which the application would be installed. In one embodiment, the container ID identifies a directory location of a file directory in which the software package is to be installed. At block 703, the software package is installed at a container identified by a randomly generated container ID. Thereafter, a relationship or correlation information between the application ID and the container ID is stored in a trusted or secure storage location such as a trusted cache within the device. As a result, since a container ID is randomly generated, an application would not know or has no preexisting relationship with its container and container ID. The correlation between an application ID and a container ID is only known and maintained by a system component such as the operating system. One of the purposes to install an application within a specific container is to isolate applications (e.g., third-party applications) from each other. An application can only be installed and executed within its own container without any privilege to access another container of another application.

Figure 8:
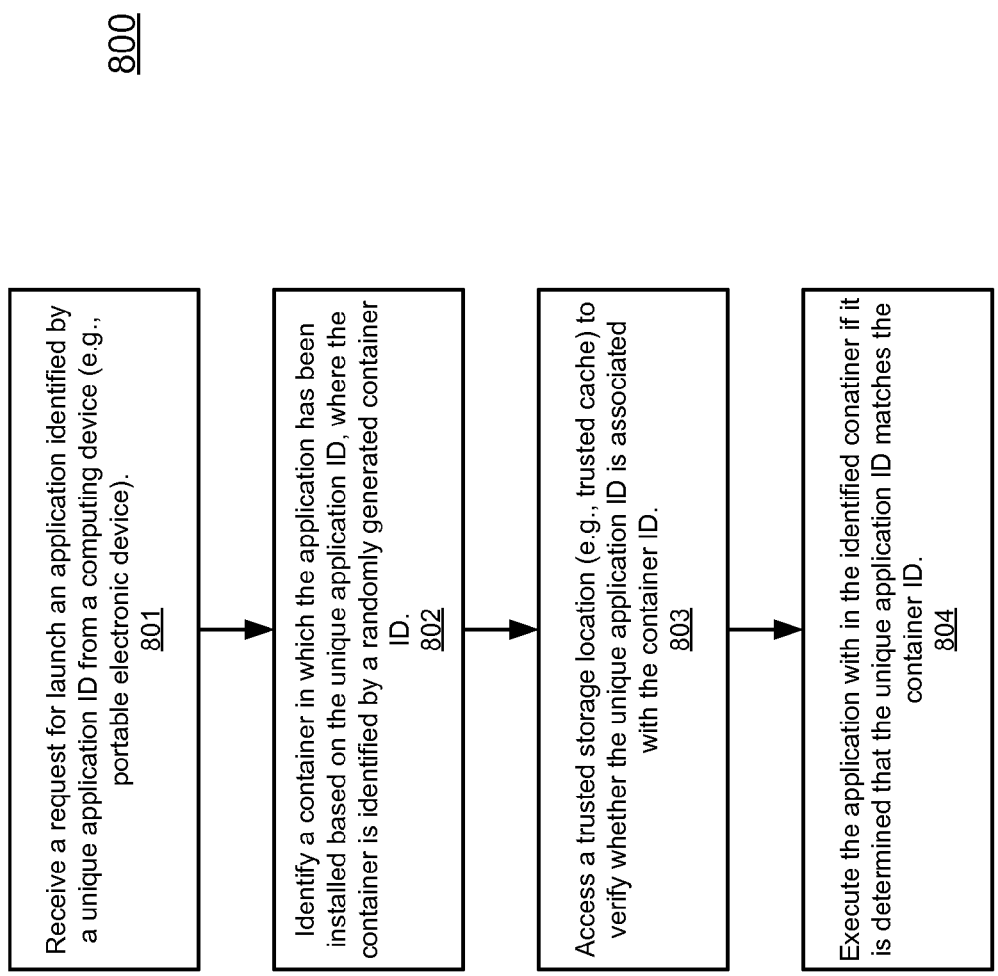
FIG. 8 is a flow diagram illustrating a method for managing securely installed applications according to one embodiment.

FIG. 8 is a flow diagram illustrating a method for managing securely installed applications according to one embodiment. Note that method 800 may be performed by processing logic which may include software, hardware, or a combination thereof. For example, method 800 may be performed by a system as shown in FIG. 6. Referring to FIG. 8, at block 801, a request for launching an application is received. The request includes an application ID that identifies the application to be launched, where the application has been previously installed in the system, for example, using a method as shown in FIG. 7. In response to the request, at block 802, a container is identified based on the application ID and a contain ID associated with the container is retrieved. For example, based on the application ID which is unique in identifying the application, a search is conducted to locate a container (e.g., directory location) having the application installed.

At block 803, based on the retrieved container ID, processing logic accesses a secured storage location such as a trusted cache to verify whether the application to be launched is associated with a container identified by the container ID. For example, the secured location may include a table or data structure to maintain a relationship between an application ID and a container ID. At block 804, if the container ID matches the one stored in the secured storage location, the associated application identified by the application ID is launched within the associated container. Note that when an application is executed, in addition to those provided by the system components (e.g., OS), the application can only access data within its container and it cannot access data of another container associated with another application.

Figure 9:
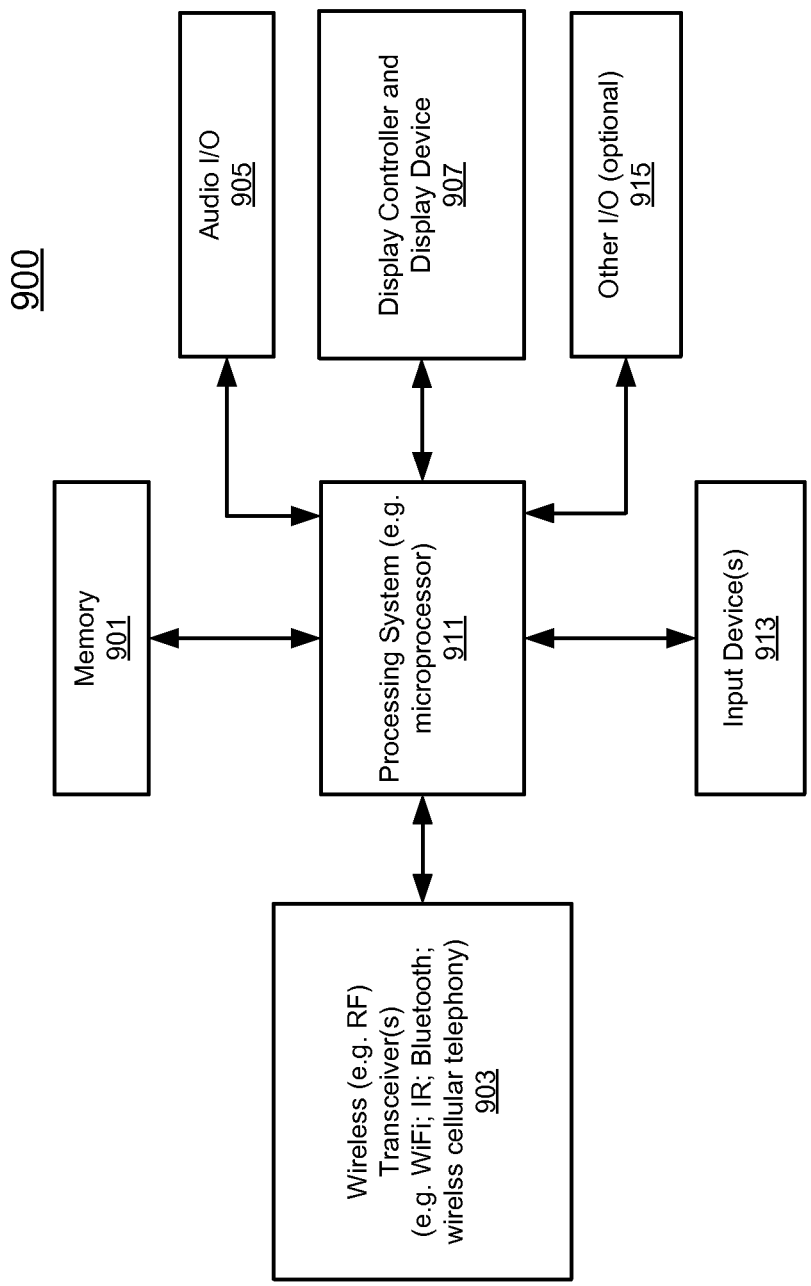
FIG. 9 shows an example of a data processing system which may be used with one embodiment of the present invention.

FIG. 9 shows an example of another data processing system 900 which may be used with one embodiment of the present invention. For example, system 900 may be implemented as part of system as shown in FIG. 3. The data processing system 900 shown in FIG. 9 includes a processing system 911, which may be one or more microprocessors, or which may be a system on a chip integrated circuit and the system also includes memory 901 for storing data and programs for execution by the processing system. The system 900 also includes an audio input/output subsystem 905 which may include a microphone and a speaker for, for example, playing back music or providing telephone functionality through the speaker and microphone.

A display controller and display device 907 provide a visual user interface for the user; this digital interface may include a graphical user interface which is similar to that shown on a Macintosh computer when running OS X operating system software. The system 900 also includes one or more wireless transceivers 903 to communicate with another data processing system A wireless transceiver may be a WiFi transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system.

The data processing system 900 also includes one or more input devices 913 which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a portable gaming device, or a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or other types of data processing systems which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod™ or iPod Nano™ media player from Apple Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of managing program code installed on a device, the method comprising:
   in response to a request to execute program code installed on the device within a container, determining a randomly assigned container identifier associated with the container,
   wherein the randomly assigned container identifier is unknown to the installed program code and the value of the randomly assigned container identifier is independent of the program code;
   verifying whether the randomly assigned container identifier matches an entry stored in a trusted cache, the entry correlating the randomly assigned container identifier with the requested program code; and
   permitting the program code to execute on the device within the container in response to the randomly assigned container identifier matching the entry in the trusted cache.

2. The method of claim 1, further comprising preventing the program code from executing when the randomly assigned container identifier does not match an entry in the trusted cache.

3. The method of claim 1, wherein determining the randomly assigned container identifier for the container for the requested program code comprises calling a library function.

4. The method of claim 1, wherein checking whether the randomly assigned container identifier matches an entry stored in a trusted cache comprises performing a string comparison between the randomly assigned container identifier to the entry in the trusted cache.

5. The method of claim 1, further comprising authenticating a digital signature associated with the program code.

6. A mobile device configured to manage an application installed on the device, wherein the application is provided a container having a randomly assigned container identifier that is unknown to the application, the device comprising:
   at least one storage;
   a processor configured to receive a request to execute the program code on the device, determine the randomly assigned container identifier for the container for the requested program code, check whether the randomly assigned container identifier matches an entry stored in a trusted cache, and permit the program code to execute on the device within the container if the randomly assigned container identifier matches an entry in the trusted cache, wherein the application can only access data within the container.

7. The device of claim 6, wherein the processor is configured to prevent the application from executing when the randomly assigned container identifier does not match an entry in the trusted cache.

8. The device of claim 6, wherein the processor is configured to determine the randomly assigned container identifier for the container for the requested program code based on calling a library function.

9. The device of claim 6, wherein the processor is configured to check whether the randomly assigned container identifier matches an entry stored in a trusted cache based on performing a string comparison between the randomly assigned container identifier to the entry in the trusted cache.

10. The device of claim 6, wherein the processor is configured to authenticate a digital signature associated with the program code.

11. A machine-readable storage medium having instructions stored therein, which when executed by a machine, cause the machine to perform a method of managing program code installed on a device, the method comprising:

in response to a request to execute program code installed on the device, determining a randomly assigned container identifier for a container for the requested program code, wherein the randomly assigned container identifier is unknown to the installed program code, and the value of the randomly assigned container identifier is independent of the installed program code;

verifying whether the randomly assigned container identifier matches an entry stored in a trusted cache; and permitting the program code to execute on the device within the container if the randomly assigned container identifier matches an entry in the trusted cache.

12. The machine-readable storage medium of claim 11, wherein the method further comprises preventing the program code from executing when the randomly assigned container identifier does not match an entry in the trusted cache.

13. The machine-readable storage medium of claim 11, wherein determining the randomly assigned container identifier for the container for the requested program code comprises calling a library function.

14. The machine-readable storage medium of claim 11, wherein checking whether the randomly assigned container identifier matches an entry stored in a trusted cache comprises performing a string comparison between the randomly assigned container identifier to the entry in the trusted cache.

15. The machine-readable storage medium of claim 11, wherein the method further comprises authenticating a digital signature associated with the program code.

16. A method of managing applications, the method comprising:

receiving a request to launch an application, the request including an application identifier for the application to be launched;

identifying a container having the application installed, wherein identifying comprises conducting a search based on the application identifier to locate a container having the application installed;

retrieving a container identifier associated with the container, wherein the value of the randomly assigned container identifier is independent of the application;

determining whether a correlation exists in a secure storage location between the application and the container, wherein the correlation exists in response to the container identifier being associated with the application identifier by a correlation stored in the secured storage location; and launching the application within the container in response to determining that the correlation exists.

17. The method of claim 16, wherein the application can only access data within the container.

18. The method of claim 16, wherein the application cannot access data of another container associated with another application.

19. The method of claim 16, wherein the container comprises a directory location.

20. The method of claim 16, wherein the container identifier is randomly generated.

* * * * *